(12) United States Patent
Aichner et al.

(10) Patent No.: US 6,231,940 B1
(45) Date of Patent: May 15, 2001

(54) INTERIOR FIXTURE OR FITTING PART FOR VEHICLES AND AN ASSOCIATED PRODUCTION METHOD

(75) Inventors: Rudolf Aichner, Kirchberg; Hermann Böckel, Geisenhausen, both of (DE); Roland Friedberger, Simpsonville, SC (US)

(73) Assignee: Eldra Kunststofftechnik GmbH, Geisenhausen (DE)

( * ) Notice: Subject to any disclaimer, the term of this patent is extended or adjusted under 35 U.S.C. 154(b) by 0 days.

(21) Appl. No.: 08/996,484

(22) Filed: Dec. 22, 1997

(30) Foreign Application Priority Data

Dec. 23, 1996 (DE) ............................................... 196 54 246

(51) Int. Cl.⁷ ...................................................... B32B 5/16
(52) U.S. Cl. .............................. 428/36.2; 52/3; 52/309.1; 52/309.5; 428/332; 428/337; 428/339
(58) Field of Search ......................... 428/332, 540, 428/337, 339, 36.2; 52/3, 309.1, 309.5

(56) References Cited

U.S. PATENT DOCUMENTS

| | | | | |
|---|---|---|---|---|
| 3,873,998 | * | 4/1975 | Norris et al. ............................... | 2/2.5 |
| 4,287,116 | * | 9/1981 | Burns .................................. | 260/37 N |
| 4,389,447 | * | 6/1983 | Disselbeck et al. .................. | 428/178 |
| 4,663,210 | | 5/1987 | Schreiber et al. .................... | 428/160 |
| 4,746,385 | | 5/1988 | Wagner ................................. | 156/155 |
| 4,890,877 | | 1/1990 | Ashtiani-Zarandi et al. ........ | 296/146 |
| 4,917,931 | * | 4/1990 | McDowell et al. ..................... | 428/88 |
| 5,029,939 | * | 7/1991 | Smith et al. .......................... | 297/284 |
| 5,204,170 | * | 4/1993 | Kuyzin .................................. | 428/244 |
| 5,225,476 | * | 7/1993 | Sperk et al. .......................... | 524/507 |
| 5,514,458 | * | 5/1996 | Schulze-Kadelbach et al. ..... | 428/246 |
| 5,519,094 | * | 5/1996 | Tseng et al. .......................... | 525/440 |
| 5,833,321 | * | 11/1998 | Kim et al. ........................ | 297/452.42 |
| 5,851,457 | * | 12/1998 | Peterson et al. ..................... | 264/46.5 |
| 5,888,616 | * | 3/1999 | Ang ...................................... | 428/141 |
| 5,932,056 | * | 8/1999 | Mark et al. ........................... | 156/266 |
| 5,951,798 | * | 9/1999 | Schmidt et al. ...................... | 156/148 |
| 5,960,527 | * | 10/1999 | Ellison et al. ......................... | 29/428 |

FOREIGN PATENT DOCUMENTS

| | | |
|---|---|---|
| 29 17 907 | 11/1979 | (DE) . |
| 3336934 C2 | 1/1987 | (DE) . |
| 3606375 C2 | 1/1988 | (DE) . |
| 4141113 A1 | 6/1993 | (DE) . |
| 4214389 A1 | 11/1993 | (DE) . |
| 19545596 A1 | 6/1996 | (DE) . |
| 2 022 510 | 12/1979 | (GB) . |

\* cited by examiner

*Primary Examiner*—Hoa T. Le
(74) *Attorney, Agent, or Firm*—Finnegan, Henderson, Farabow, Garrett & Dunner, L.L.P.

(57) ABSTRACT

An interior fixture or fitting part for vehicles, particularly motor vehicles, comprising a rigid molded support part (2), a layer of knitted spacer fabric (3) or formed fabric disposed on a surface of the molded support part (2) and a layer of natural leather (4) on the knitted spacer fabric (3) or formed fabric as well as a first adhesive layer (5) between molded support part (2) and knitted spacer fabric (3) or formed fabric and a second adhesive layer (6) between knitted spacer fabric (3) or formed fabric and natural-leather layer (4). An associated production method is also proposed.

19 Claims, 2 Drawing Sheets

INTERIOR FIXTURE OR FITTING PART FOR VEHICLES AND AN ASSOCIATED PRODUCTION METHOD

FIELD OF THE INVENTION

The invention relates to an interior fixture or fitting part for vehicles and to an associated method of producing interior fixture or fitting parts. The invention particularly relates to motor vehicles, but it can also be used in other vehicles, such as rail vehicles or aircraft.

RELATED ART

There is a variety of different material compositions and production processes for interior fixture or fitting parts in motor vehicles, such as dashboards, center consoles or door trims. To lend the vehicle interior an attractive design, a wide variety of decorative materials is used on the visible side of the interior fixtures and fittings, e.g. plastic films, velour, fabric or imitation leather. Natural leather is used as a decorative material in the case of more exclusive interior fixtures and fittings.

Since real leather is a natural material, the aspects which must be taken into consideration when natural leather is processed differ from those relevant to synthetic decorative materials. In this way, natural leather's tendency to shrink during leather processing plays an important part. As a decorative material for interior fixture or fitting parts with a rigid molded support part, such as dashboards, natural leather has so far been attached directly to the rigid molded support parts. As a result, the rigid molded support part supports the leather cover applied thereto. With this material structure and the associated known production processes, the natural leather is lent adequate adhesion on the shaping rigid support part and the natural leather's direct support counteracts shrinkage of the leather cover. If such an interior fixture or fitting part with decorative natural leather is touched, the part feels correspondingly hard, apart from the minimum flexibility of the leather itself.

On the other hand, it is known from patent DE 33 36 934 C2 that upholstery consisting of a foam body should be provided in the lower region of a vehicle's dashboard in order thereby to achieve a dashboard flexibility which reduces injuries. The foam body, e.g. composed of a soft-textured polyurethane, is provided with a cover of foam sheeting, textile material, imitation leather or leather. Patent DE 36 06 375 C2 which originates from the same applicant also describes an interior fixture or fitting part with a flexible padding layer. What is proposed is a method in which an additional leather cover is subsequently affixed to the interior fixture or fitting part covered with a plastic film so as to upgrade the quality of the occupant interior. In these known interior fixture or fitting parts, such a substantial flexibility is therefore aimed at that injuries, e.g. sustained during an unintentional collision or an impact caused by an accident, are avoided.

Yet it would be desirable to implement a certain limited degree of flexibility for the decorative natural leather in the case of interior fixtures and fittings which are per se rigid and which come with natural leather decorative features, such as dashboards or center consoles, since the interior fixture or fitting part consequently produces a special haptic quality, i.e. a particular tactile sensation, thus lending the interior fixtures and fittings a specific character. The flexibility or softness is only intended to be slight in comparison to a degree of absorption which reduces injuries.

Published document DE-OS 29 17 907 A1 describes a method of producing a dashboard; in this method, a flat piece of material that preferably comprises a semi-rigid resin, e.g. PVC, is bonded with a flat piece of foam material and such a laminate formed in this manner is joined by means of adhesive to a base member, e.g. made of ABS artificial resin. This publication also mentions leather as a flat piece of material instead of the semi-rigid resin, though without discussing in more detail the specific problems associated with processing real leather as a natural material in comparison with a synthetic material such as PVC.

For although a rear padding of natural leather using foam would make it possible to achieve a certain flexibility when the decorative material is touched, it has been shown in practice that the natural leather's tendency to shrink—e.g. when there are stresses due to climatic changes—causes it to peel away particularly in concavely shaped areas of the interior fixture or fitting part or produces a wavy or uneven surface aspect. This problem also exists in the case of the aforementioned foam upholstery which reduces injuries if this padding is covered with decorative natural leather.

A large-surface heat-deformable plastic trim part for the interior of an automobile and a method for its production are indeed known from DE 41 41 113 A1. In this trim part, however, a decorative layer of mainly polyolefinically constructed polymers is laminated during the process of forming the molded part; this layer comprises a multilayer knitted or woven fabric with knitted-in spacers made of preferably polyolefinic polymer fibers, with only applied decorative textile surfaces or printed or embossed plastic films as well as woven, knitted textiles or nonwoven fabrics being envisaged as a decorative layer. Obviously a natural material, such as natural leather is not used here and is not envisaged either. This document evidently aims at a uniformity of materials for the overall structure, by exclusively using polymer-based components. This is intended to solve the recycling problem felt to be a drawback in the prior art described therein. A polymer material is also always envisaged in the case of that version of the knitted spacer fabric with topside coating. The knitted spacer fabric's topside coating is to be constituted for example by a polyolefin film, onto which a surface structure is impressed. It can therefore be stated in summary that the knitted spacer fabric's top layer provided here is to be decoratively finished off toward the visible side, either by an embossed film or by a decorative textile effect. Material uniformity is always the overriding aspect. The problems associated with the use of natural materials, such as natural leather, cannot be taken into consideration for these materials and such problems do not occur either.

Although DE 42 14 389 A1 also describes a layer composition of a decorative or surface layer, an adjoining, easily yielding spacer layer and optionally a backing joined thereto, the emphasis in this previously known solution—similar to the aforementioned DE 41 41 113 A1—is also placed on a recyclable product composition that exhibits material uniformity. The three layers are therefore each supposed to comprise an identical or similar plastic or to contain this plastic. The individual layers are also intended to be joined together without the use of adhesives. The use of additional adhesives is felt to be a disadvantage here.

Finally, DE 195 45 596 A1 describes an inner trim and/or seat cover fabric for vehicles which comprises a multilayer fabric with a textile backing cloth, a top web and a formed fabric (nonwoven fabric) layer. The backing cloth is a fine-meshed knitted fabric with tied-up pile loops torn by napping and composed of a staple-fiber or multifilament yarn with a plurality of single fibers, the napped pile of which forms a padding layer in the form of a napped fiber web. The technical problem that is to be solved by the present invention—i.e. to lend interior fixture or fitting parts (which are rigid per se and which are to be provided with decorative natural leather) a specific flexibility or softness which is supposed to be only slight in comparison to an absorptive capacity which reduces injuries—therefore does not even arise here. Without a rigid molded support part, decorative natural leather would not entail any separation problems either, because the overall layer composition would after all be flexible, as is for example the case with a vehicle seat cover. The solution of incorporating pile threads composed of fibrous materials into the backing cloth is likewise not comparable with a knitted spacer fabric in the sense of the present invention, since this fabric comprises two textile cover surfaces which are joined at a distance from one another by means of a fiber system, whereas the known pile undergoes compression as a result of a napping process.

SUMMARY OF THE INVENTION

The invention is therefore based on the technical problem of providing an interior fixture or fitting part for vehicles and an associated production method in which decorative natural leather on a rigid molded support part exhibits a certain limited flexibility, while nevertheless guaranteeing reliable adhesion and perfect surface shape retention for the decorative natural leather.

In accordance with the invention, this technical problem is solved by an interior fixture or fitting part comprising a rigid molded support part (2), a layer of a knitted spacer fabric (3) or a layer of formed fabric (4) disposed on a surface of the molded support part (2) and a layer of natural leather disposed on the knitted spacer fabric or the formed fabric.

It was identified in accordance with the invention that a rear padding of natural leather using a foam material particularly leads to the initially explained problems of wave or crease formation, not to mention the separation of the decorative leather, because the foam material can scarcely absorb tensile loads, and due to its porous structure this material is able to expand uncontrollably when tensile forces arise. For example, as a result of forces caused by climatic changes, such as may arise inside motor vehicles, the decorative natural leather's perfect adhesion and surface shape retention is subsequently no longer guaranteed.

In the solution according to the invention, materials which contain filament or fiber structures are used instead of a porous foam material so as to use these materials to achieve both the haptic quality aimed at, i.e., a certain desired softness, and the simultaneously requisite adhesion. In addition to pressure, these filament or fiber structures can absorb tensile loads, thus preventing the decorative leather from peeling away, which may otherwise occur particularly on those areas of the interior fixture or fitting part which are designed with relatively substantial concave curvatures.

In the first version of the invention's solution, a rigid molded support part, a knitted spacer fabric layer disposed thereon and a layer of natural leather disposed on this knitted spacer fabric are provided, with a first adhesive layer being provided between the molded support part and the knitted spacer fabric and a second adhesive layer being provided between the knitted spacer fabric and the layer of natural leather. This composite layer structure creates an interior fixture or fitting part that has a certain flexibility or softness on the decorative side and in which perfect adhesion of the natural-leather layer is ensured even when there are considerable forces caused by changes in climate and even on more substantially curved component sections.

A knitted spacer fabric comprises two textile cover surfaces which are joined together by a fiber system, to be precise at a distance from one another. The knitted spacer fabric accomplishes the desired padding effect. The textile cover surfaces each achieve particularly good adhesion between the natural-leather layer and the knitted spacer fabric and between the molded support part and the knitted spacer fabric, because there are interconnected stable contact surfaces and no open-pore contacts as in the case of foam. The textile cover surfaces also effectively prevent adhesive from emerging from the first and second adhesive layers and penetrating into the interior of the knitted spacer fabric. This is because after the adhesive had cured, penetration of adhesive into the inside of the layer between the decorative natural leather and the molded support part would harden this layer particularly in the case of forces caused by climatic changes, thus causing the desired flexibility between the natural leather and the molded support part to be lost. In this way, however, the adhesive is retained on the adhesive surfaces for the purpose of bonding. On the other hand, adhesive may penetrate without hindrance through a foam material's open-pore structure.

The knitted spacer fabric's dual-surface composition also makes it possible to shift the cover surfaces in the direction of shear relative to one another. On the one hand, this lends a particular sensation of touch to the decorative leather feature, roughly comparable to human skin, which can also be shifted in the direction of shear. On the other hand, the knitted spacer fabric can compensate relative movements between the natural leather and the molded support part, thereby preventing the leather from peeling off as a result of shrinkage. The planar contact between textile cover surface and natural-leather layer also reliably supports the leather in combating its tendency to shrink. The fiber system between the textile cover surfaces joins the cover surfaces together, while simultaneously keeping them apart. The fiber system, which may e.g. be formed from a synthetic fiber monofilament yarn, absorbs tensile loads, thus ensuring the decorative natural leather feature's adhesion. The fiber also has durable resilience which on the one hand entails the flexibility aspired to when pressure is applied to the decorative natural leather feature, and on the other hand always causes the decorative natural leather to return to its original state.

In the second version of the invention's solution, a formed fabric (nonwoven fabric) is provided instead of the knitted textile spacer fabric. A formed fabric is a fabric composed of textile fibers held together by the adhesion that is characteristic of the fibers or achieved by finishing. In this version, the fibers can absorb tensile loads as well as pressure, in contrast to a foam material. A formed fabric has exhibits a certain elasticity in shear which can compensate the relative movements between the natural-leather layer and the rigid molded support part. The composite layer structure according to the invention using a formed fabric layer produces a softness under shear in a haptic manner and a reliable adhesion of the natural leather.

In an expedient embodiment of this second version of the solution, the formed fabric comprises two formed fabric layers that are needle-punched together. The upholstery layer's elasticity in shear is optimized by this double-layer composition.

Embodiments of the two previously explained versions of the invention's solution will be described as follows.

In the layer of a knitted spacer fabric or a formed fabric as envisaged by the invention, a good haptic quality can—in contrast to a foam material—be achieved using a low layer thickness. It is beneficial for the layer of knitted spacer fabric or formed fabric to have a thickness in the range of 1–6 mm. The thickness of this layer preferably ranges from 2–4 mm.

In the case of the adhesive for the first adhesive layer between molded support layer and knitted spacer fabric or formed fabric, it is possible to use a standard adhesive which is preferably activated by heat. The second adhesive layer between natural leather and knitted spacer fabric or formed fabric can also be accomplished using different adhesives, preferably a two-component polyurethane adhesive or a hot-melt adhesive. The natural leather from which the decorative layer is made is preferably shrink-optimized leather. The rigid molded support part may be a molded part composed of sheet metal, thermosetting plastic, thermoplastic, composite materials etc. Because of its low tendency to warp, preference is given to a molded support part made of fiber-reinforced polyurethane, whereby the fiber reinforcement may e.g. comprise glass fibers or natural fibers. A low-warpage molded support part contributes toward the stability and permanence of the overall layer composition with decorative natural leather.

In the version with a formed fabric, it may be particularly expedient to provide blocking coats which are known per se between the adhesive layers and the intermediate padding layer so as to minimize penetration of the adhesive into the intermediate padding layer. It may also be expedient to provide a blocking coat between the natural-leather layer and the associated adhesive layer in order to minimize penetration of adhesive into the leather as well.

The method according to the invention of producing an interior fixture or fitting part envisages first producing a composite layer by bonding the back of a natural-leather blank to a surface of a planar blank composed of knitted spacer fabric or formed fabric. In a second step, the composite layer is then affixed to a surface of a separately produced molded support part. The natural leather is preferably shrink-optimized by at least one of several possible procedural steps for shrink optimization, e.g. by heat treatment, before the composite layer is formed.

The invention produces an interior fixture or fitting part with a decorative natural leather feature which is particularly soft under shear in a haptic manner. Tendencies to peel off, which are produced by the tendency of the natural material leather to shrink, are effectively repressed by the layer structure according to the invention, thus achieving durable adhesion and dimensional stability for the decorative natural leather feature of the interior fixture or fitting part.

DESCRIPTION OF THE DRAWINGS

The invention will now be explained in further detail as follows by means of preferred exemplary embodiments with reference to the attached drawings.

DESCRIPTION OF PREFERRED EMBODIMENTS

Figure 1:
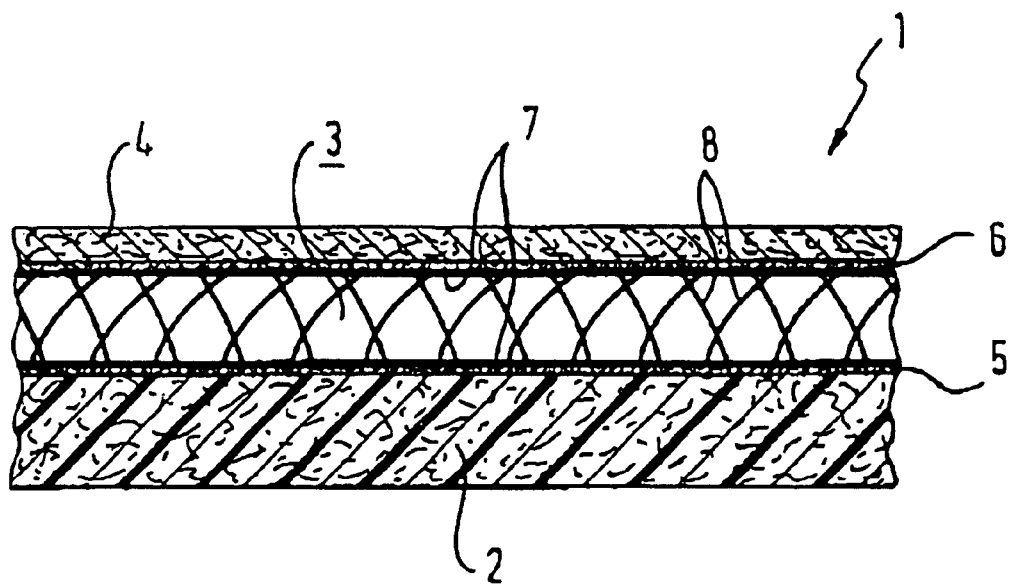
FIG. 1 shows a detail of a first exemplary embodiment of the interior fixture or fitting part according to the invention with a knitted textile spacer fabric in a schematic sectional representation.
Figure 2:
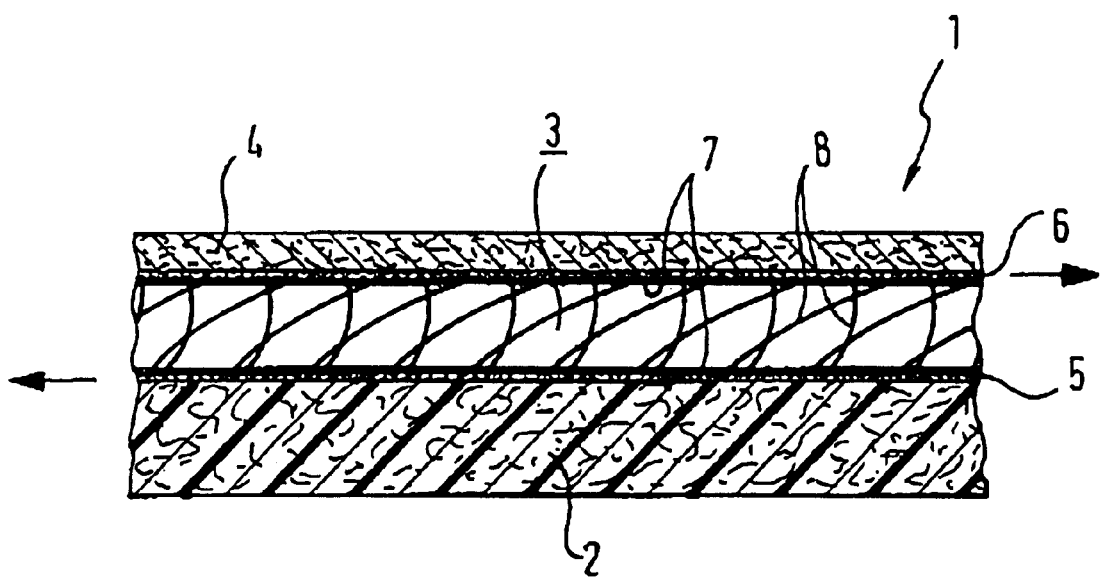
FIG. 2 shows the detail of FIG. 1 in a state under load in the direction of shear.
Figure 3:
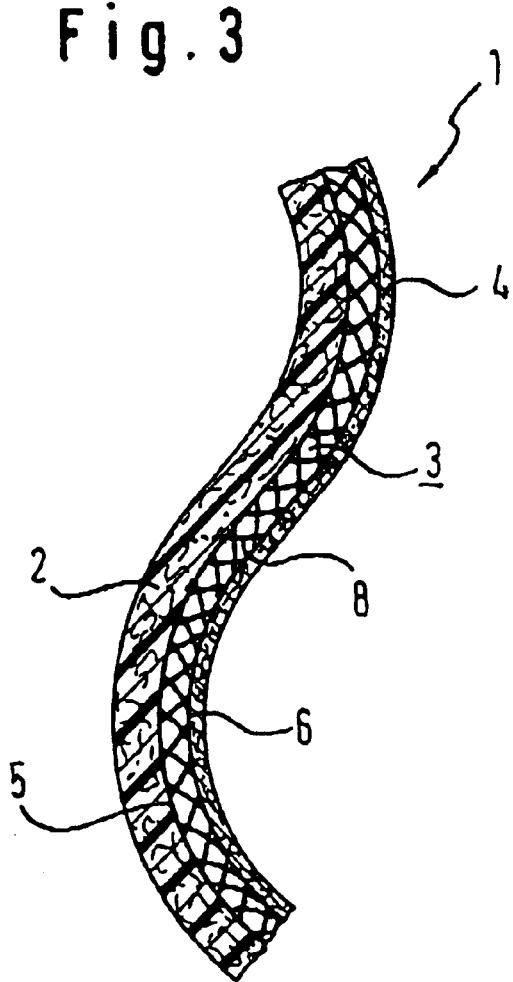
FIG. 3 shows another, curved detail of the interior fixture or fitting part of FIG. 1.

FIGS. 1–3 show details of a first exemplary embodiment of an interior fixture or fitting part 1, for example an automobile dashboard. The interior fixture or fitting part 1 is constructed as a composite layer. The base forms a rigid molded support part 2 which is produced e.g. from a fiber-reinforced artificial resin material. A layer of a knitted textile spacer fabric 3 is provided on the surface of the molded support part 2. A layer of natural leather 4 which forms the decorative layer toward the vehicle interior is in turn located on the surface of the knitted spacer fabric 3. The molded support part 2 is joined to the knitted spacer fabric 3 by means of an adhesive layer 5, and the natural-leather layer 4 is likewise joined to the knitted spacer fabric by means of an adhesive layer 6. The knitted spacer fabric 3 comprises two textile cover surfaces 7 spaced apart from one another and which are joined together by a fiber system 8, for instance a monofilament yarn.

Whereas FIG. 1 shows the composite layer of the interior fixture or fitting part 1 in a non-stressed state, FIG. 2 illustrates a state in which a shearing load acts upon the composite layer (see arrow). The shearing load causes the two textile cover surfaces 7 of the knitted spacer fabric 3 to shift relative to one another. The fiber system 8 permits such a relative shift and after the load has disappeared, this system ensures that the initial state is restored again. The textile cover surfaces 7 can also be shifted toward one another, i.e. perpendicular to the cover surface planes. The resilience of the fiber system 8 also counteracts the pressure load here. The knitted textile spacer fabric 3 also allows a mixture of shear and compressive set, which produces a special haptic quality for the decorative natural leather.

FIG. 3 illustrates that the knitted spacer fabric 3 constantly ensures the necessary adhesion of the natural-leather layer 4 even when the interior fixture or fitting part 1 is lent a—e.g. concavely—curved shape, since the knitted spacer fabric with its fiber system 8 adapts to the curvature pattern of the interior fixture or fitting part and particularly absorbs any tensile loads that arise.

Figure 4:
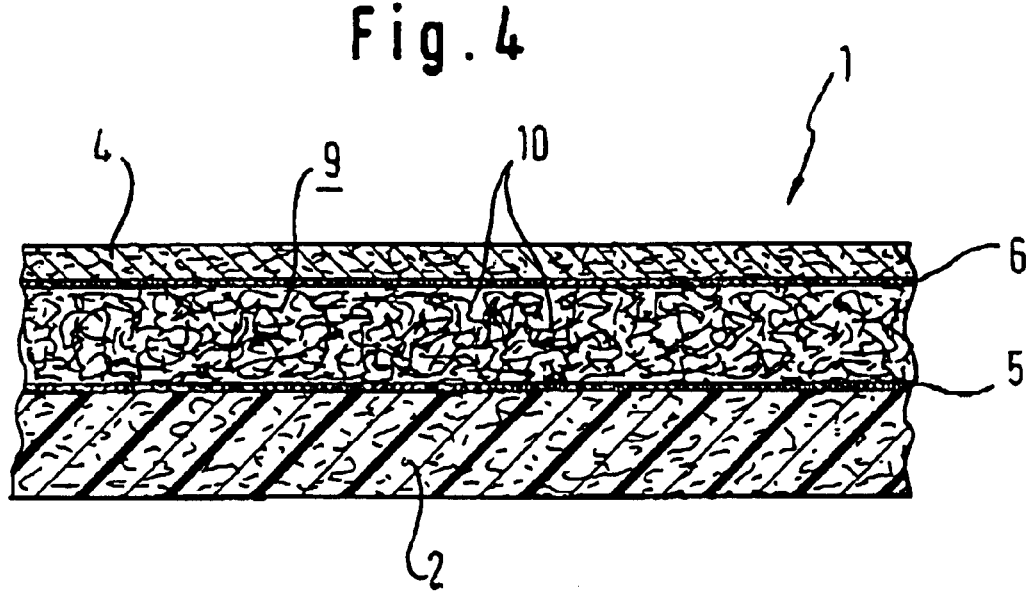
FIG. 4 a detail of a second exemplary embodiment of the interior fixture or fitting part according to the invention with a formed fabric in a schematic sectional representation The same reference symbols will be used in the Figures for identical or corresponding components.

FIG. 4 shows the composite layer structure—analog to the first exemplary embodiment—of a second exemplary embodiment with a formed fabric layer 9. This formed fabric comprises a plurality of fibers 10 which can particularly absorb tensile loads.

What is claimed is:

1. An interior fixture or fitting part for vehicles, comprising
   a molded support part,
   a layer of a knitted spacer fabric disposed on a surface of said molded support part, wherein said knitted spacer fabric has two textile cover surfaces spaced at a distance from one another and joined together by a fiber system,
   a layer of natural leather disposed on said knitted spacer fabric,
   a first adhesive layer bonding said molded support part and said knitted spacer fabric together, and
   a second adhesive layer bonding said knitted spacer fabric a said natural-leather layer together.

2. An interior fixture or fitting part according to claim 1, wherein the layer of a knitted spacer fabric has a thickness of 1–6 mm.

3. An interior fixture or fitting part according to claim 2, wherein the layer of a knitted spacer fabric has a thickness of 2–4 mm.

4. An interior fixture or fitting part according to claim 1, wherein said adhesive layer between said molded support part and said knitted spacer fabric is composed of a heat-activated adhesive.

5. An interior fixture or fitting part according to claim 1, wherein said second adhesive layer between said natural leather and said knitted spacer fabric is composed of a two-component polyurethane adhesive.

6. An interior fixture or fitting part according to claim 1, wherein said second adhesive layer between said natural leather and said knitted spacer fabric is composed of a hot-melt adhesive.

7. An interior fixture or fitting part according to claim 1, wherein said natural leather is shrink-optimized leather.

8. An interior fixture or fitting part according to claim 1, wherein said molded support part is composed of a fiber-reinforced polyurethane.

9. An interior fixture or fitting part according to claim 1, wherein the molded support part is formed of a fiber-reinforced artificial resin.

10. An interior fixture or fitting part for vehicles, comprising
   a molded support part,
   a layer of a non-woven fabric formed of textile fibers disposed on a surface of said molded support part,
   a layer of natural leather disposed on said non-woven fabric,
   a first adhesive layer bonding said molded support part and said non-woven fabric together, and
   a second adhesive layer bonding said formed non-woven fabric and said natural-leather layer together.

11. An interior fixture or fitting part according to claim 10, wherein said non-woven fabric has two formed fabric layers needle-punched together.

12. An interior fixture or fitting part according to claim 10, wherein the layer of a non-woven fabric has a thickness of 1–6 mm.

13. An interior fixture or fitting part according to claim 10, wherein the layer of a non-woven fabric has a thickness of 2–4 mm.

14. An interior fixture or fitting part according to claim 10, wherein said first adhesive layer bonding said molded support part and said non-woven fabric together is composed of a heat-activated adhesive.

15. An interior fixture or fitting part according to claim 10, wherein said second adhesive layer bonding said natural leather and said non-woven fabric together is composed of a two-component polyurethane adhesive.

16. An interior fixture or fitting part according to claim 10, wherein said second adhesive layer bonding said natural leather and said non-woven fabric is composed of a hot-melt adhesive.

17. An interior fixture or fitting part according to claim 10, wherein said natural leather is shrink-optimized leather.

18. An interior fixture or fitting part according to claim 10, wherein said molded support part is composed of fiber-reinforced polyurethane.

19. An interior fixture or fitting part according to claim 10, wherein the molded support part is formed of a fiber-reinforced artificial resin.

* * * * *